(12) United States Patent
Kushwah et al.

(10) Patent No.: US 7,752,176 B1
(45) Date of Patent: Jul. 6, 2010

(54) SELECTIVE DATA RESTORATION

(75) Inventors: Ajay Pratap Singh Kushwah, San Ramon, CA (US); Venkatesh Murthy, Bangalore (IN)

(73) Assignee: EMC Corporation, Mountain View, CA (US)

( * ) Notice: Subject to any disclaimer, the term of this patent is extended or adjusted under 35 U.S.C. 154(b) by 481 days.

(21) Appl. No.: 10/816,202

(22) Filed: Mar. 31, 2004

(51) Int. Cl.
*G06F 7/00* (2006.01)
(52) U.S. Cl. ........................................ 707/679; 711/170
(58) Field of Classification Search ........................ None
See application file for complete search history.

(56) References Cited

U.S. PATENT DOCUMENTS 5,313,604 A * 5/1994 Godwin ...................... 711/162
6,269,381 B1 * 7/2001 St. Pierre et al. ............ 707/202
2003/0065901 A1 * 4/2003 Krishnamurthy ............ 711/170
2005/0187992 A1 * 8/2005 Prahlad et al. .............. 707/204

* cited by examiner

*Primary Examiner*—Charles Rones
*Assistant Examiner*—Belix M Ortiz
(74) *Attorney, Agent, or Firm*—Van Pelt, Yi & James LLP

(57) ABSTRACT

Identifying a file system element for restoration is disclosed. The technique comprises of receiving a request to restore a file system element; determining an offset indicating where a record associated with the file system element is located within a collection of records, wherein the record includes metadata related to stored data to be used to restore the file system element; and using the determined offset to retrieve the record from the collection of records.

21 Claims, 13 Drawing Sheets

| MSB (DIR/FILE) | INODE | OFFSET | |
|---|---|---|---|
| 1 | 5 | (OFFSET=0) | 600A' |
| 1 | 6 | (OFFSET=180) | 600B' |
| 1 | 7 | (OFFSET=260) | 600C' |
| 0 | 8 | (OFFSET=1000) | |
| 1 | 100 | (OFFSET=100) | |
| 0 | 101 | (OFFSET=2000) | |
| 0 | 200 | (OFFSET=2800) | 600Z' |
| | | | |

←— 8 BYTES —→←——— 8 BYTES ———→

SELECTIVE DATA RESTORATION

FIELD OF THE INVENTION

The present invention relates generally to computers, more specifically to backup and restoration of data.

BACKGROUND OF THE INVENTION

The need for data backup becomes more evident as people become more dependent on their computers. Typically, entire computer hard discs can be backed up and restored when necessary. Selective restoration, however, such as the restoration of a particular file or directory, is typically more difficult. Where millions of files are backed up, selective restoration of identified files or directories typically result in poor performance, taking hours to restore a requested file. It would be desirable to improve the performance for selective restoration of data.

BRIEF SUMMARY OF THE INVENTION

A request to restore a file system element is received. An offset indicating where a record associated with the file system element is located within a collection of records is determined. The record includes metadata related to stored data to be used to restore the file system element. The determined offset is used to retrieve the record from the collection of records.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
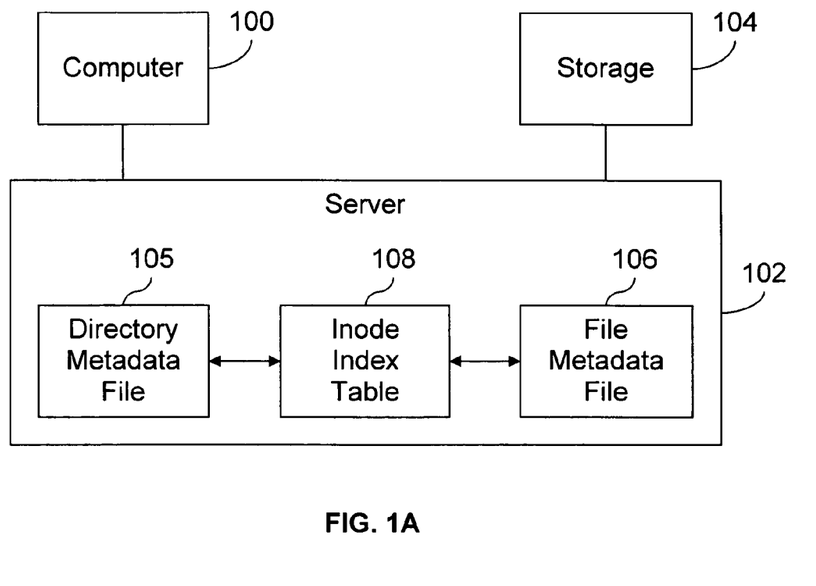
FIGS. 1A-1B are block diagrams of a system suitable for a technique for identifying a file system element, such as a directory or file, for restoration according to some embodiments.
Figure 1B:
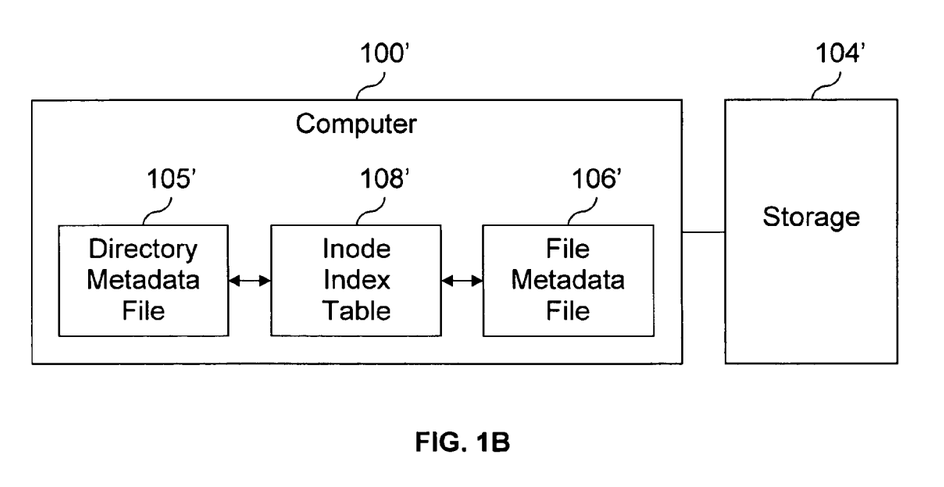

FIGS. 1A-1B are block diagrams of a system suitable for a technique for identifying a file system element, such as a directory or file, for restoration according to some embodiments. In the example shown in FIG. 1A, a computer 100 (client) is shown to be connected to a server 102 which in turn is shown to be connected to a storage device 104. An example of the storage device 104 is a tape drive. The server 102 is shown to include a directory metadata file 105, an inode index table 108, and a file metadata file 106. Details about the directory metadata file 105, the inode index table 108, and the file metadata file 106 will later be discussed in conjunction with the remaining figures. In the example shown in FIG. 1B, a computer 100' is shown to be connected to a storage device 104'. In this example, the directory metadata file 105', the inode index table 108', and the file metadata file 106' are shown to be included in computer 100'.

The various components of the systems shown in FIGS. 1A-1B can be situated locally or remotely such that data in computer 100, 100' can be backed up and retrieved using either a local storage device 104, 104' or a remote storage device 104, 104'.

According to some embodiments, when data is backed up to the storage device 104 and 104', two streams of information are sent in addition to a data stream. One stream of data is herein referred to as the directory metadata, while the other stream of data is herein referred to as the file metadata. These streams of information can be placed in separate files so that there is a directory metadata file 105 and a file metadata file 106 on the storage media and additionally on the (server's or client's) File system as files at a specified place reserved for the purpose with a recycling policy.

Figure 2:
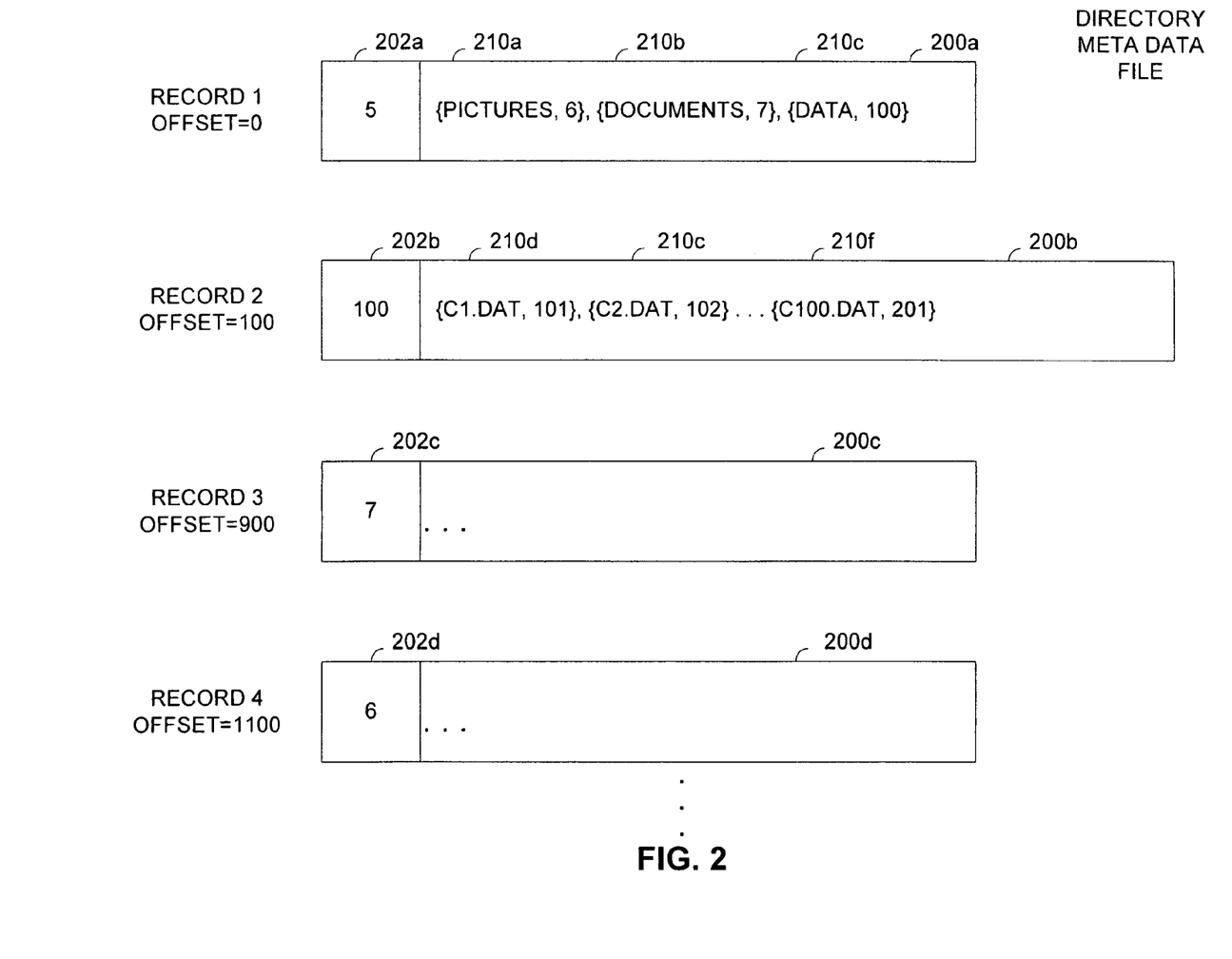
FIG. 2 shows an example of a directory metadata file 105.

FIG. 2 shows an example of a directory metadata file 105. In some embodiments, the directory metadata file includes information regarding the directories, such as the inode number for the directory and information regarding the directories' children such as their file names and inode numbers. An inode is a number, preferably a unique number, that uniquely identifies a file system element such as a file or directory. An inode number, or its conceptual derivative, can be internally used by the file system. Accordingly, when metadata is collected for an inode, this metadata is information associated with a file system element such as a file or a directory.

Records 200A-200D are shown. In this example, the directory metadata records 200A-200D are received in an unpredictable order and are of variable sizes. Records 200A-200D include the inode number 202A-202D associated with the record. The records 200A-200D also include the children 210A-210F of the directory or file associated with the inode number 202A-202D. The example of record 200A shows that the directory having the inode number 5 includes the children 210A-210C named "pictures", "documents", and "data". "Pictures" has the inode number 6, "documents" has the inode number 7 and "data" has the inode number 100.

Because each record 200A-200D in the directory metadata file can be of a variable length, the offset of the record, indicating the location of the record 200A-200D in the directory metadata file, is saved according to some embodiments. In some embodiments, the offset is saved in an inode index table 108. The record 200A is shown to be the first record with an offset of 0 and a length of 100 bytes. The record 200B is shown to be the second record and therefore having an offset of 100 bytes. The record 200C is shown to be the third record and has an offset of 900 for the example of the second record 200B having a length of 800 bytes. The record 200D is shown to be the fourth record and has an offset of 1100 for the example of the third record 200C having a length of 200 bytes.

Figure 3:
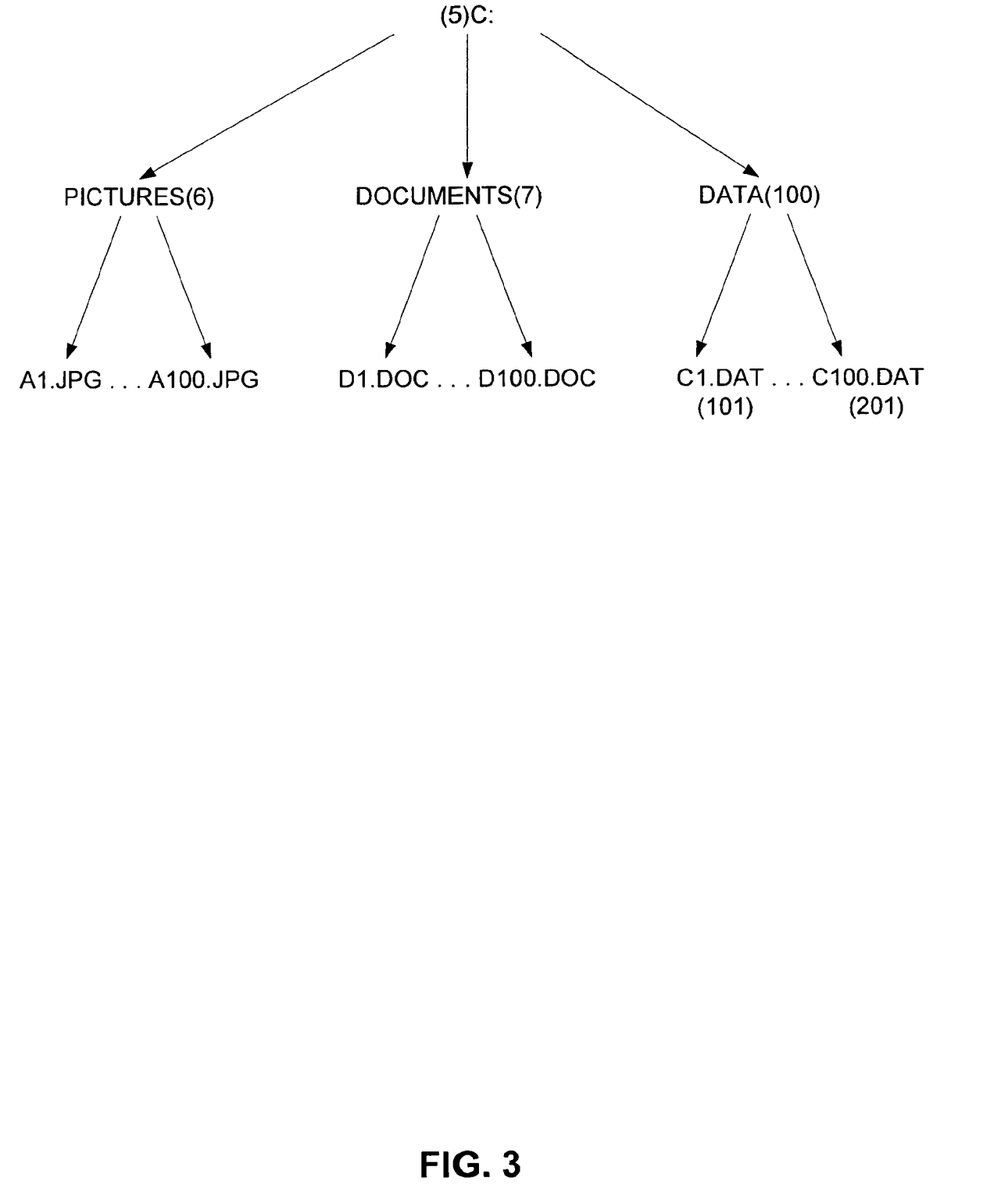
FIG. 3 is an illustration of a directory structure such as that shown in FIG. 2.

FIG. 3 is an illustration of a directory structure on a user File system such as that shown in FIG. 2. In this example, the directory "C:" has the inode 5 in this example, which corresponds to record 200A of FIG. 2. Directory "C:" is shown to have the children "pictures", "documents", and "data". The children directories have the inodes 6, 7, and 100, respectively.

"Pictures" is shown to have children A1.jpg-A100.jpg, "documents" is shown to have children D1.doc-D100.doc, and "data" is shown to have children C1.dat-C100.dat. "Data" is shown to have the inode 100 which corresponds to record 200B of FIG. 2. As shown in record 200B of FIG. 2, C1.dat has inode 101, C2.dat has inode 102, and C100.dat has the inode 201.

In the example shown in FIG. 3, directories include "C:", "pictures", "documents", and "data". Files include A1.jpg-A100.jpg, D1.doc-D100.doc, and C1.dat-C100.dat.

Figure 4:
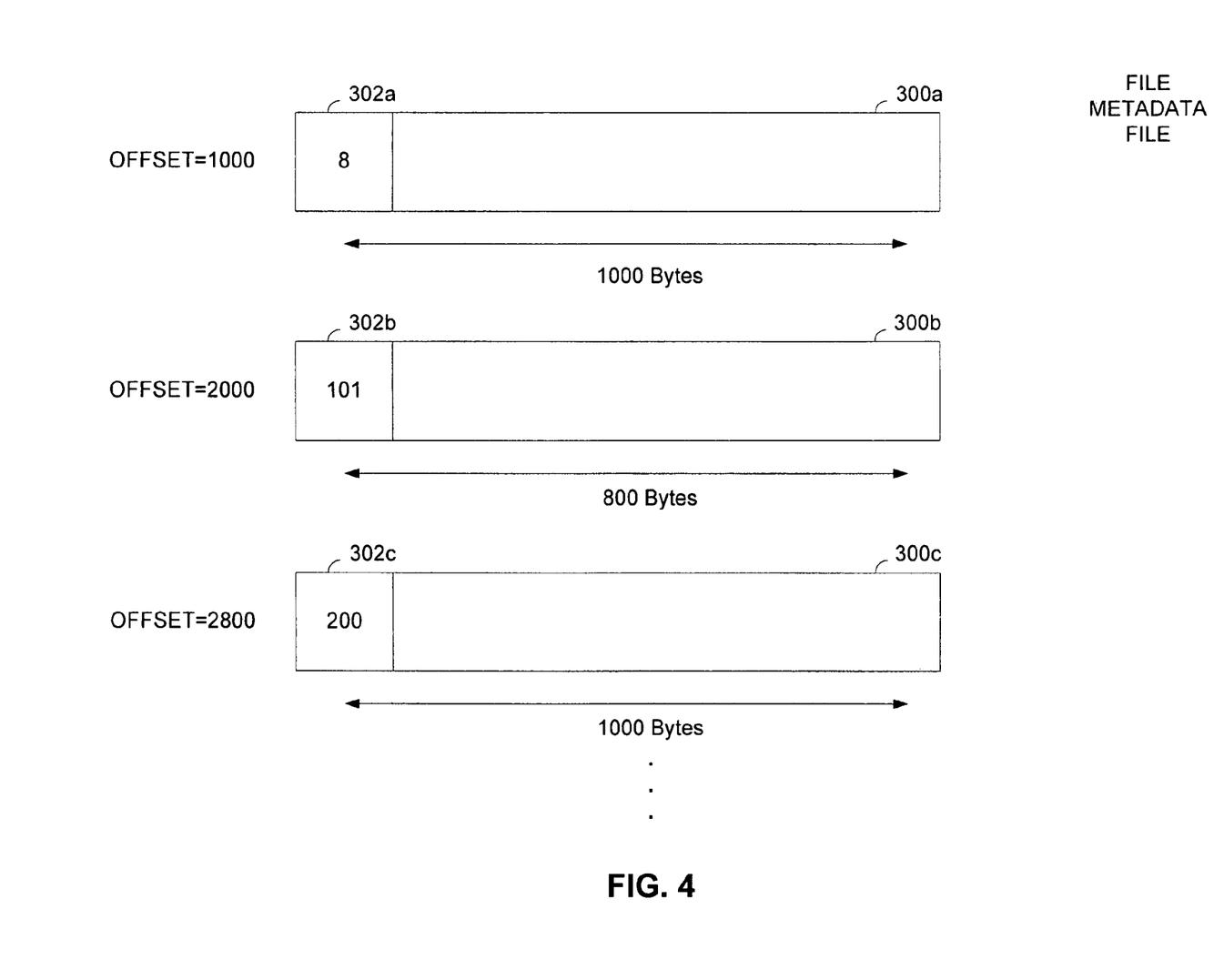
FIG. 4 is an illustration of a file metadata file according to some embodiments.

FIG. 4 is an illustration of a file metadata file according to some embodiments. In this example, records 300A-300C are of a variable size and are received in an unpredictable order. They are shown to include inode numbers 302A-302C. Record 300A is shown to be 1000 bytes, record 300B is shown to be 800 bytes, and record 300C is shown to be 1000 bytes. In some embodiments, a record in the file metadata file contains offsets to all the blocks in the storage medium, such as the tape, belonging to that particular stored file. The Records in the file metadata file includes other information associated with the file as well, such as the inode number associated with the file, and the file attributes. For example, administrative information about the file, such as permissions and advance control options, are stored in the file metadata file in a record corresponding to that file.

Similar to the directory metadata file, because each record 300A-300D in the file metadata file can be of a variable length, the offset of the record, indicating the location of the record 300A-300D in the file metadata file, is saved according to some embodiments. In some embodiments, the offset is saved in an inode index table 108.

Figure 5:
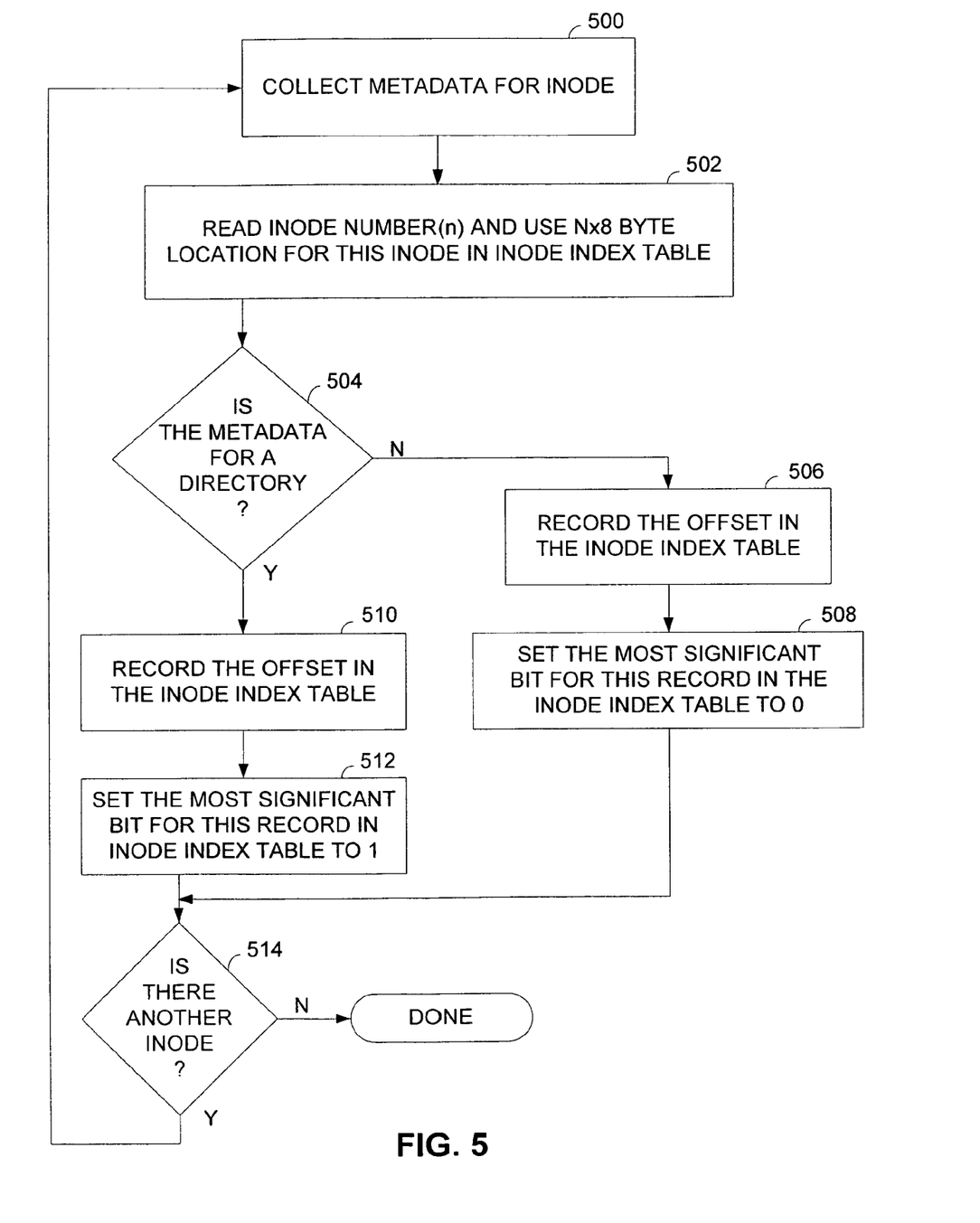
FIG. 5 is a flow diagram of a method for populating the inode index table according to some embodiments.

FIG. 5 is a flow diagram of a method for populating the inode index table according to some embodiments. In this example, the method shown in FIG. 5 occurs during a backup phase. FIG. 5 is best understood in light of FIGS. 6A-6B.

In the example shown in FIG. 5, metadata associated with an inode is collected (500). The inode number (N) is read and the N×8 byte location is used in an inode index table for this inode (502). N is used in this example to denote the inode number. Examples of an inode index table are shown in FIGS. 6A-6B.

Figure 6A:
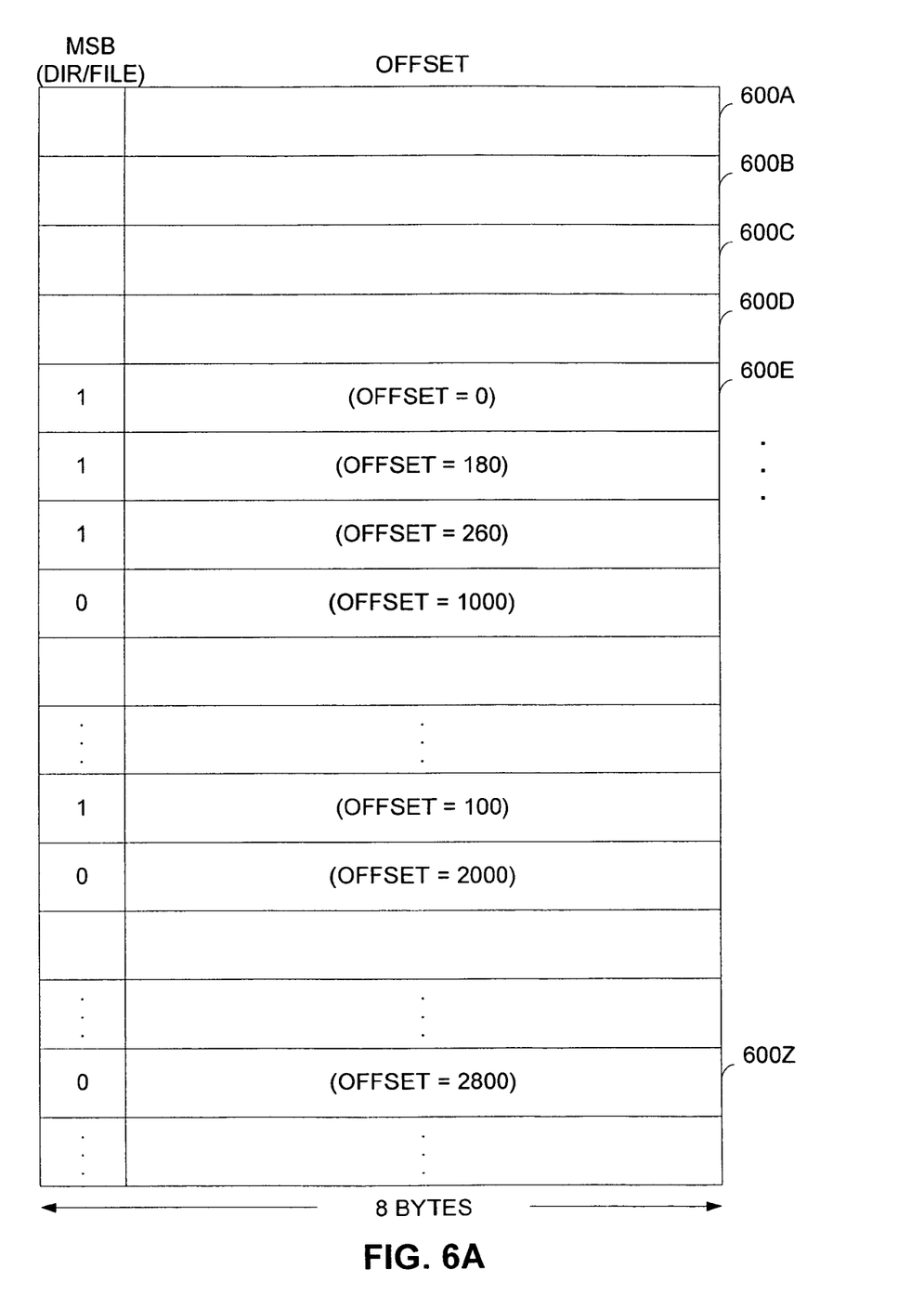
FIGS. 6A-6B show examples of an inode index table according to some embodiments.
Figure 6B:
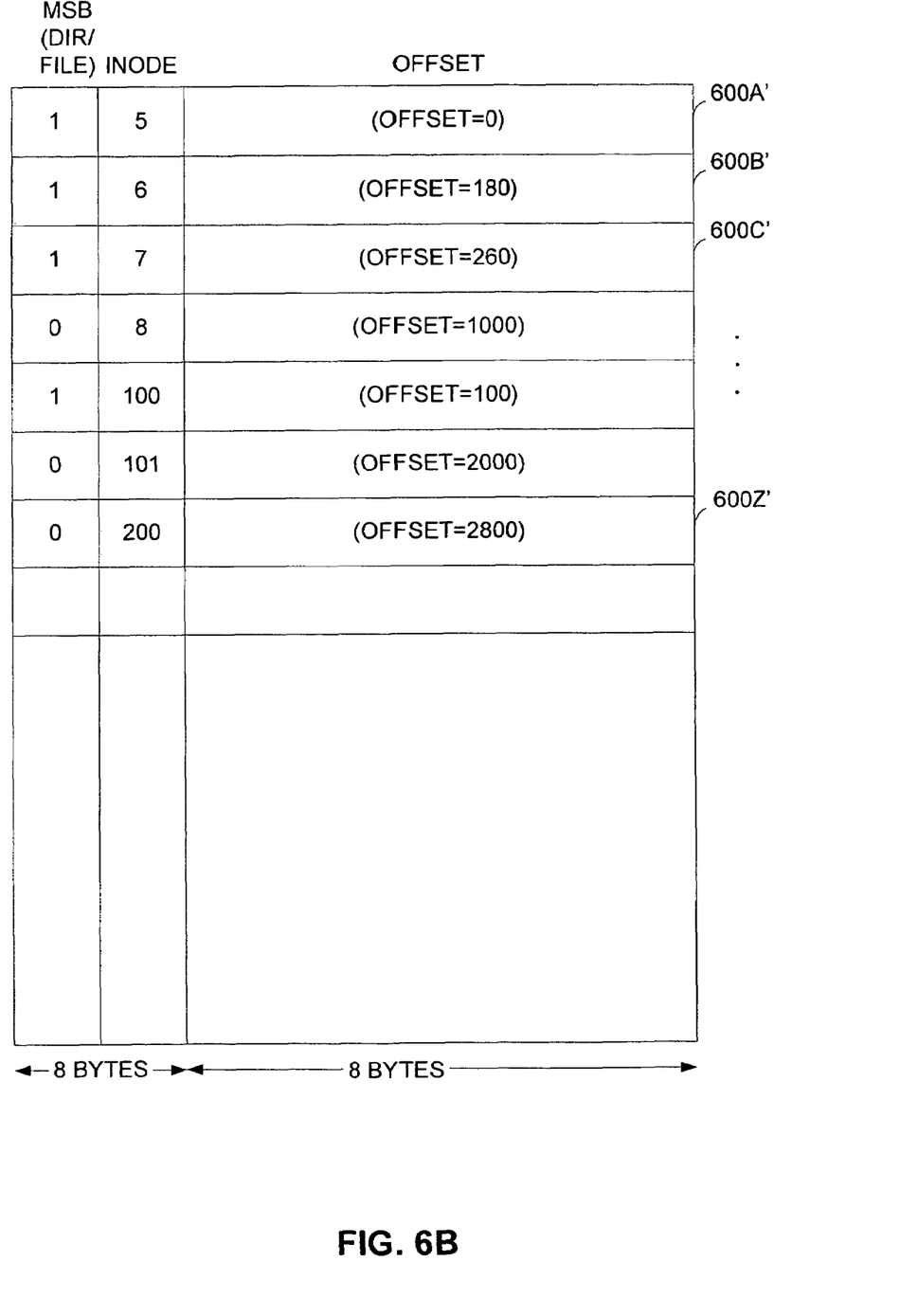

FIGS. 6A-6B show examples of an inode index table according to some embodiments. The example shown in FIG. 6A shows an inode index table wherein each entry 600A-600Z indicates whether the corresponding inode is a directory or a file, and the offset of the corresponding record. If the inode corresponds to a directory, then the offset is the offset location in the directory metadata file. Likewise, if the inode corresponds to a file, then the offset is the offset location in the file metadata file. The inode index table records 600A-600Z use the most significant bit (MSB) to indicate whether the corresponding inode is a directory or a file, in this example. In the example shown in FIG. 6A, 1 is used to indicate directory, while 0 is used to indicate file. The total size of each record 600 is shown to be a fixed size such as 8 bytes. Each record can correspond to a single inode in a sequential manner. For example, in FIG. 6A, inode 1 corresponds to the first record 600A, inode 2 corresponds to the second record 600B, etc.

In the example shown in FIGS. 2 and 4, the record 200A of FIG. 2 has an inode number of 5. Accordingly, in the inode index table, the information corresponding to the directory metadata file record 200A would use the fifth inode index table record 600E which would be the 5×8 byte location (N×8) of the inode index table as recited in 502 of FIG. 5.

FIG. 6B shows an example of another embodiment of the inode index table. In this example, the entries in the inode index table are organized in a sequential manner so that the inode index table records 600A'-600Z' are located next to, or near, each other. This configuration is particularly useful for use with a File system with a very large value for the max inode number used, but with a lot of unused intermediate inode numbers resulting from frequent deletion of files. In the example shown in FIG. 6B there is a field for the inode as well as a field for the offset, with the most significant bit of the inode number indicating whether the corresponding inode is a directory or a file. An example of the fixed size of the inode index table records 600A'-600Z' is 8 bytes for the offset and 8 bytes for the inode and MSB, for a total of 16 bytes available for the offset and inode.

When using the embodiment shown in FIG. 6B, an optional determination can be made whether the use of such an inode index table shown in FIG. 6B will save space and then compress the table shown in FIG. 6A to take the form of that shown in FIG. 6B. The records 600A'-600Z' can be organized, such as sequentially, according to the inode number so that they can be searched quickly using binary search in the restore.

Once the record position, or bit location, of the inode index table is established for the corresponding inode number (502 of FIG. 5), it is determined whether the metadata is for a directory or a file (504). One example of determining whether the metadata is for a directory or a file is to parse the metadata which is being saved. If it is not a directory, then the offset of the record is recorded in the corresponding location in the inode index table (506) and the fact that this metadata is for a file is recorded in the inode index table by setting the MSB of the entry. For example, the most significant bit for this record in the inode index table is set to 0 to indicate that it is a file (508).

If the metadata that is being analyzed is for a directory (504), then the offset of the directory record is recorded in the inode index table (510), and the fact that it is a directory is recorded in the inode index table record corresponding to this inode. For example, the most significant bit for this record can be set to 1 to indicate that it is a directory (512).

It is then determined whether there is another inode to be analyzed (514). If there are no more metadata records to be analyzed, then the population of the inode index table is complete. If there is another inode to be analyzed (514), then the metadata for the inode is collected (500) and the same process as described above is executed.

Figure 7A:
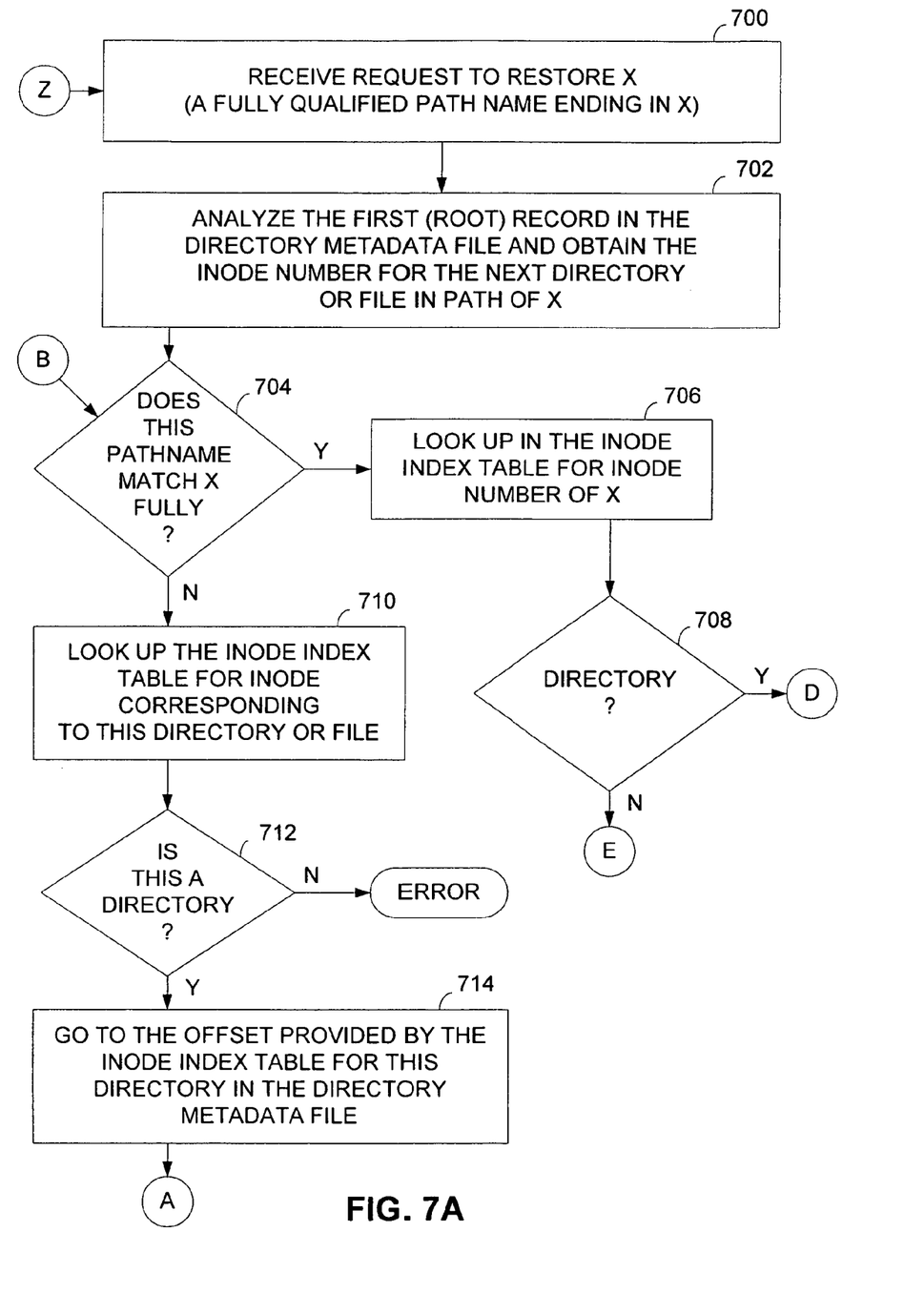
FIGS. 7A-7B are flow diagrams of a method for identifying a file system element, such as a directory or file, for restoration according to some embodiments.
Figure 7B:
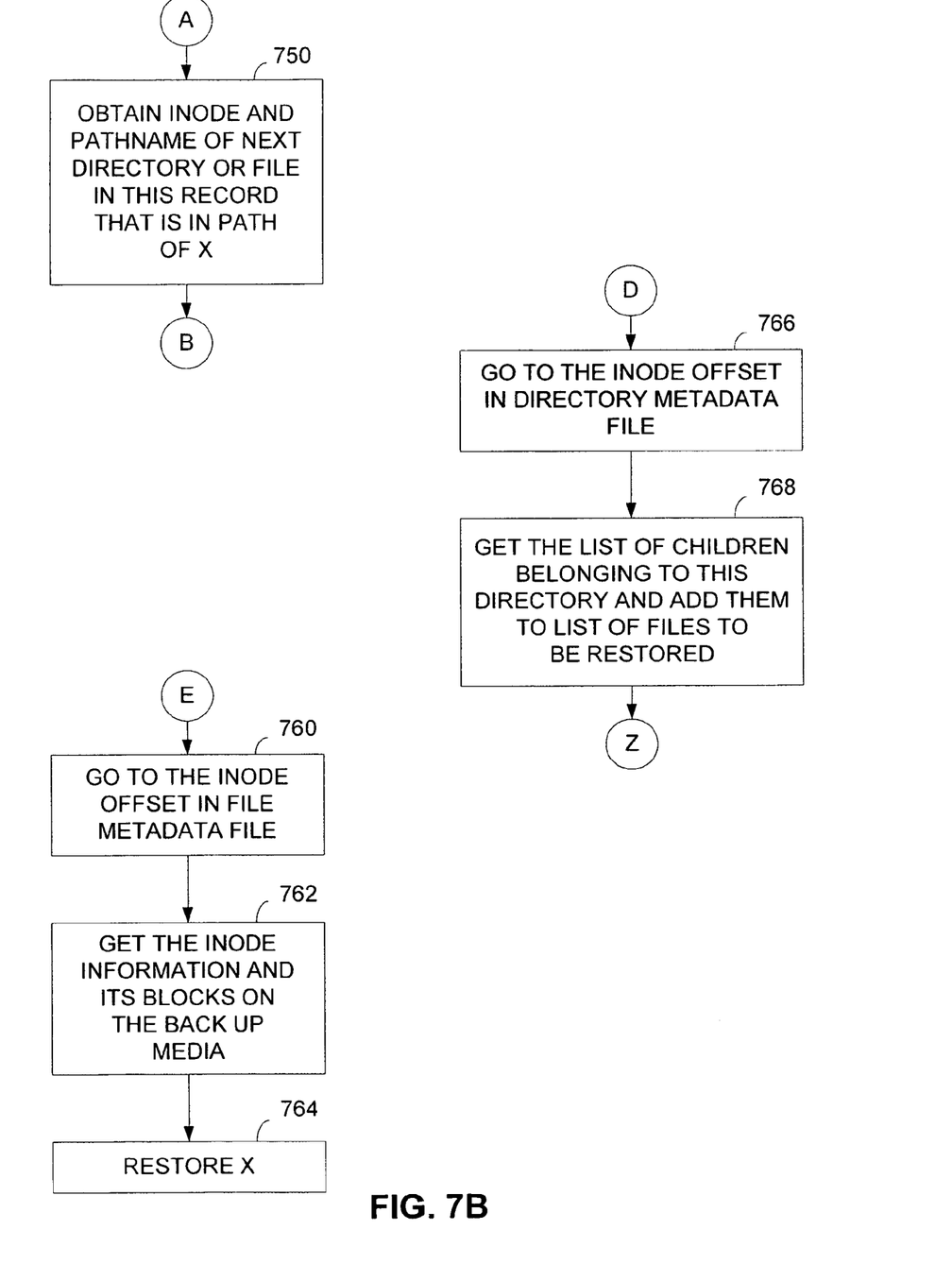

FIGS. 7A-7B are flow diagrams of a method for identifying a file system element, such as a directory or file, for restoration according to some embodiments. In this example, a request to restore X, such as a fully qualified path name ending in X, is received (700). For example, a request to restore C:\A\B\X may be received. The first (root) record in the directory metadata file is then analyzed and the inode number for the next directory or file in the path of X is obtained (702). For example, C is the first record in the directory metadata file and the inode number for the next directory or file in the path of X would be A in our example.

It is then determined whether the fully qualified name of any of the children at this level matches the complete or partial pathname of X (704). If the match is only partial, then the inode index table is referenced for the inode corresponding to this directory or file (710). Examples of the inode index table are shown in FIGS. 6A-6B. It is then determined whether this inode number corresponds to a directory (712). If it is not a directory, then it is deemed that there has been an error in this example, since X has been determined to be a descendent direct or indirect child) of this directory (702 and 704).

If this inode number corresponds to a directory (712), then the offset provided by the inode index table for this directory is accessed in the directory metadata file (714).

The directory metadata record is again analyzed to obtain the next entry in the path of X(750). It is again determined whether the fully qualified name of the entry at this level matches the complete or partial pathname of X (704). If it is partial, the inode index table is looked up again for the inode corresponding to this directory or file (710) and so on until a fully qualified pathname matches with a child entry in the directory metadata file.

If the match is full, thus indicating that X is included in this record of the directory metadata file, (704), then the inode number for X is obtained. The inode index table is then looked up for the inode number of X (706). It is then determined whether the inode number corresponds to a directory (708).

If the inode number does not correspond to a directory (758 of FIGS. 7B and 708 of FIG. 7A), then the inode offset in the file metadata file is referenced (760). For example, the offset shown in FIGS. 6A-6B is referenced and the file metadata file shown in FIG. 4 is then referenced for the offset looked up in the inode index table. The inode information and the blocks associated with the inode number on the backup media is obtained (762). Examples of inode information include attributes such as administrative information about that file. Examples of administrative information include permissions and advance control systems. Now that the data blocks associated with X have been identified on the backup media, X is restored (764).

If the inode corresponds to a directory (708 of FIGS. 7A and 758 of FIG. 7B), then the corresponding inode offset is referenced in the directory metadata file (766). The list of children belonging to this directory is obtained and they are updated to the list of files to be restored (768). An example of updating the list of files includes removing the parent directory and adding the children. In the examples shown in FIGS. 2 and 3, the children of inode number 5, which is "C" includes "pictures", "documents", "data", and all of their children as well as their children's children. The list of files to be restored is then requested to be restored (700 of FIG. 7A) and the method shown in FIG. 7A-7B is then repeated.

Figure 8A:
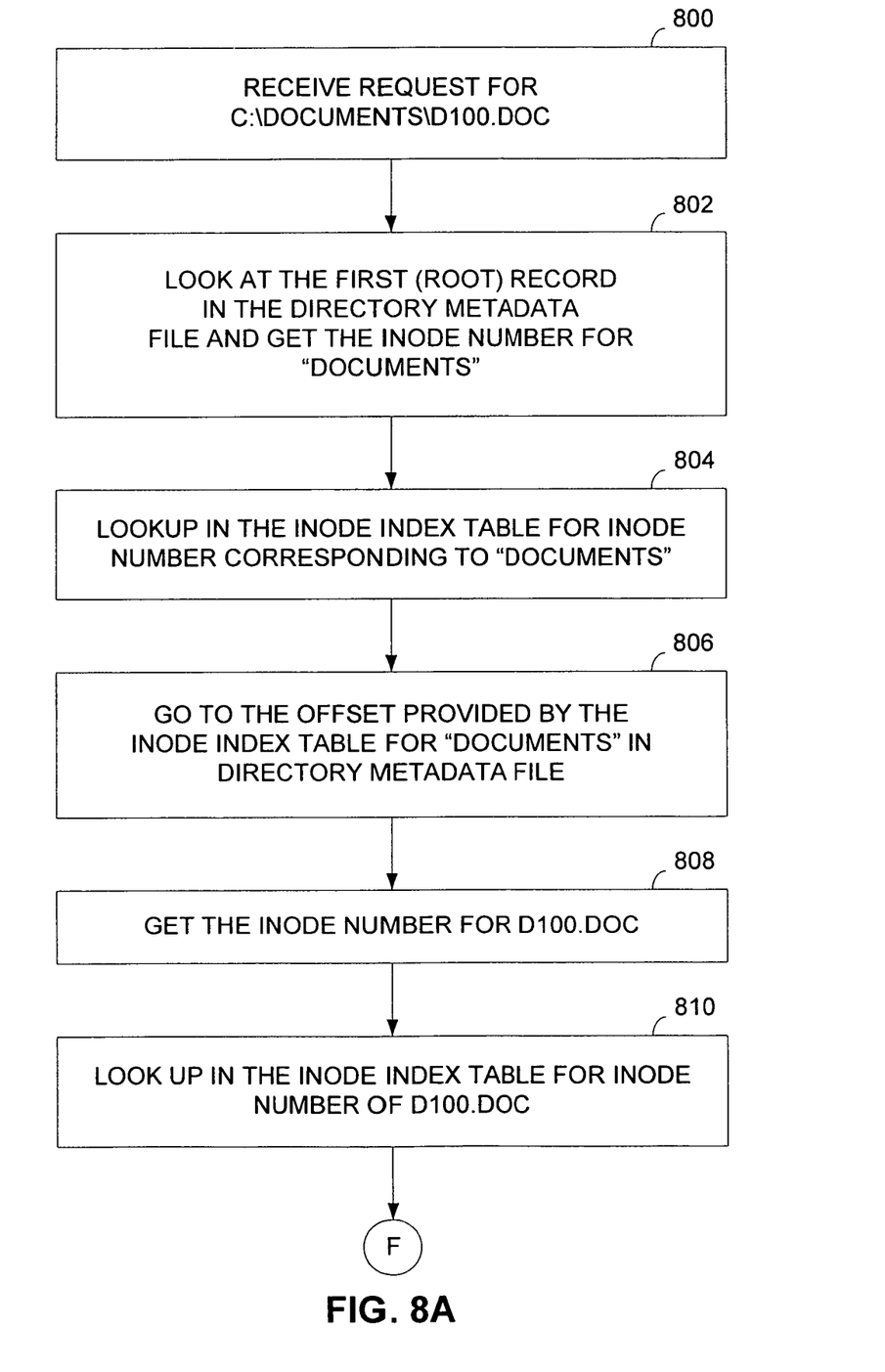
FIGS. 8A-8B are flow diagrams of an example of selective restoration of a file according to some embodiments.
Figure 8B:
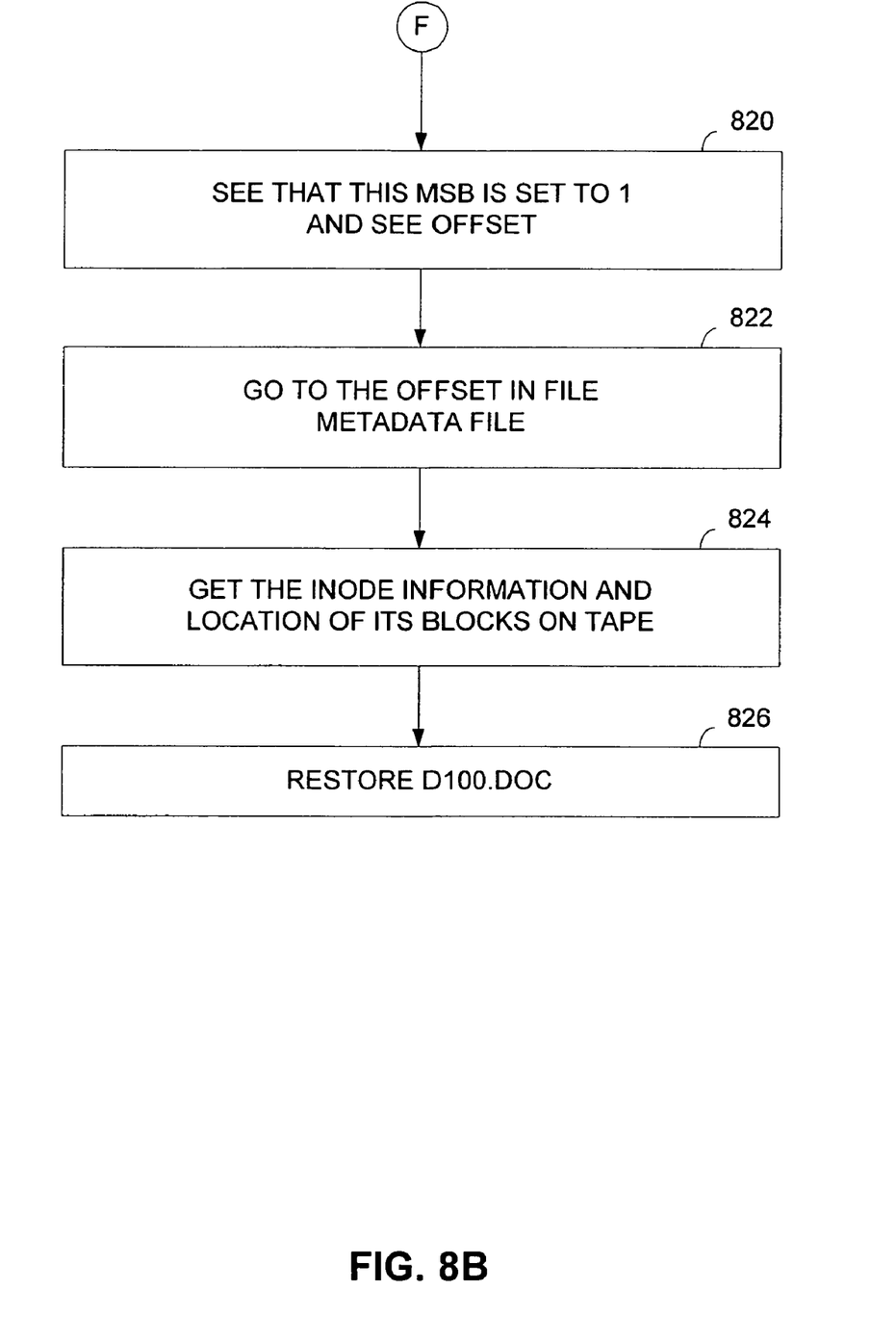

FIGS. 8A-8B are flow diagrams of an example of selective restoration of a file according to some embodiments. In this example, a request to retrieve "C:/documents/D100.doc" is received (800). The first record in the directory metadata file is referenced and the inode number for "documents" is obtained (802). The inode index table is then looked up for the inode number corresponding to "documents", as well as the offset for "documents" (804). The offset provided by the inode index table for "documents" is then referenced in the directory metadata file (806). The inode number for "D100.doc" is then obtained from the directory metadata file (810).

Since the request is for a file in this example, the inode index table will show that the most significant bit for the corresponding record is set to 1, indicating a file and therefore that the desired information will be in the file metadata file, and the corresponding offset is read (820). The corresponding offset is then referenced in the file metadata file (822). The inode information and its associated blocks on the storage tape are retrieved (824), and "D100.doc" can then be restored (826).

Figure 9A:
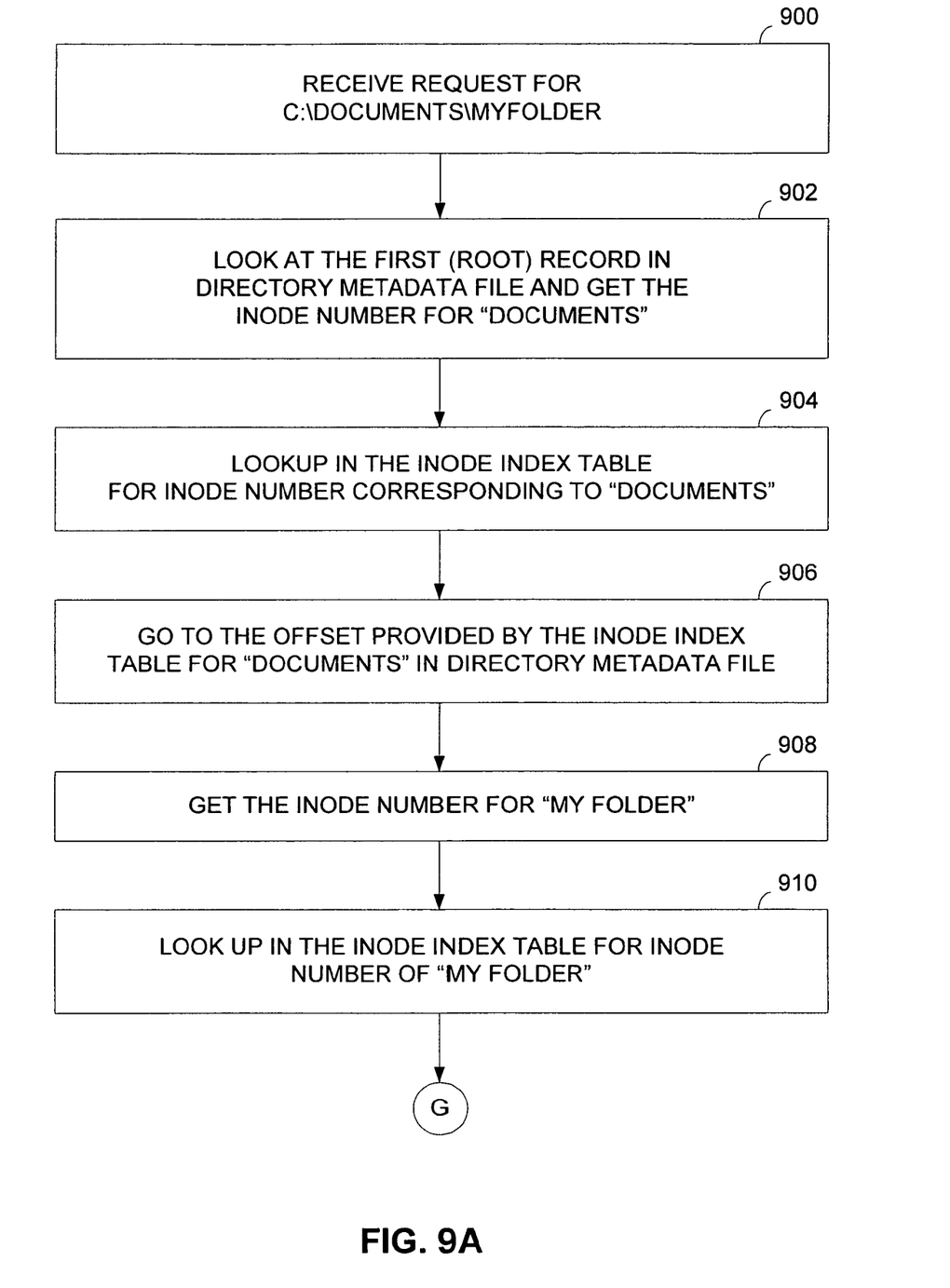
FIGS. 9A-9B are flow diagrams of an example of selective restoration of a directory according to some embodiments.
Figure 9B:
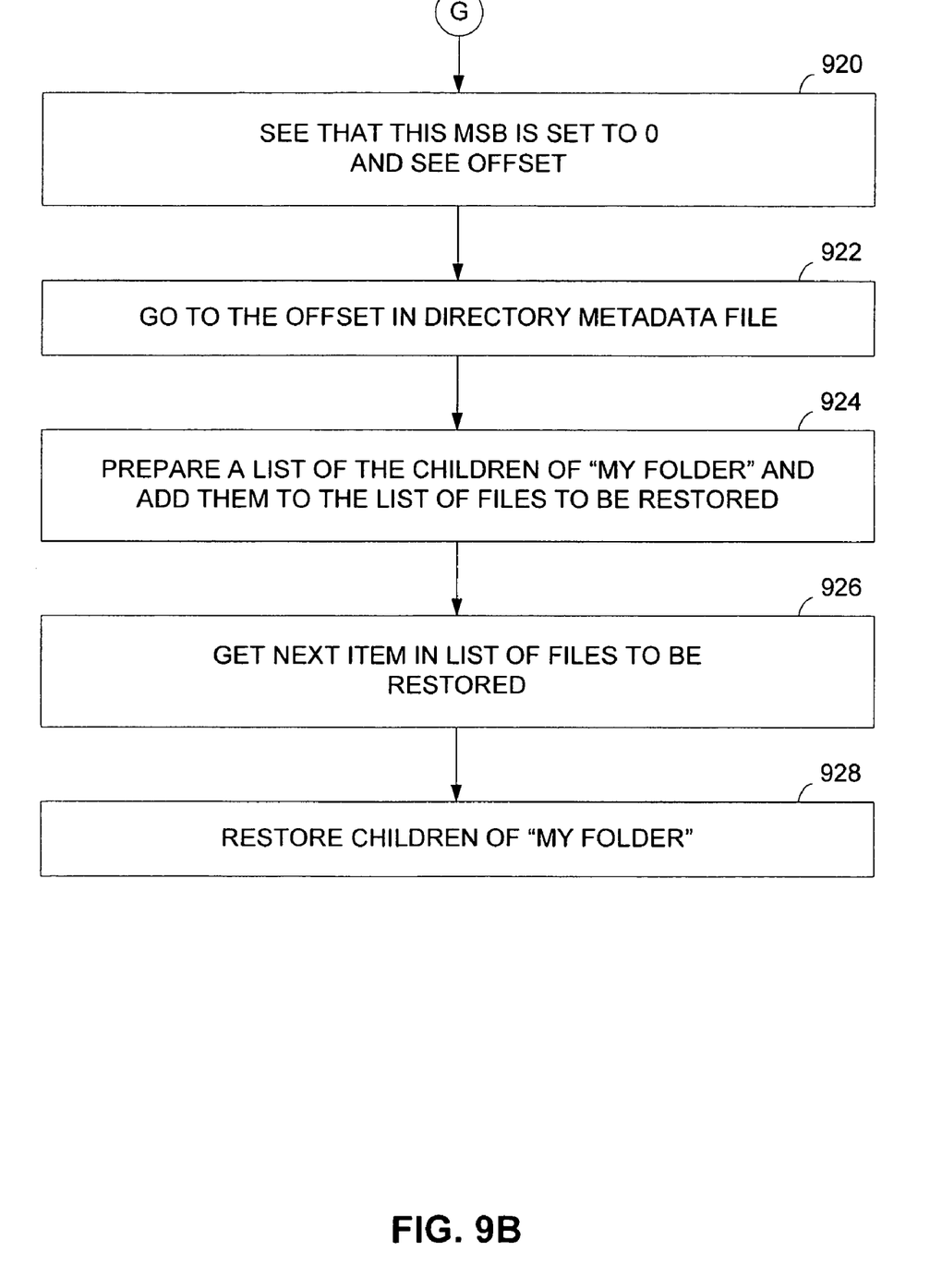

FIGS. 9A-9B are flow diagrams of an example of selective restoration of a directory according to some embodiments. In this example, a request to selectively restore "C:/documents/myfolder" is received (900). The first record in the directory metadata file is referenced and the inode number for "document" is retrieved (902). The inode index table is then looked up for the inode number corresponding to "documents" (904). The offset provided by the inode index table corresponding to "documents" is then referenced in the directory metadata file (906). The inode number for "myfolder" is then retrieved from the record found at the identified offset in the directory metadata file (908). The inode index table is then looked up for the inode number of "myfolder" (910). Since "myfolder" is a directory, the most significant bit of this record in the inode index table will be set to 0, indicating that it is a directory, and the offset is also read (920). The offset read from the inode index table is then referenced in the directory metadata file (922). A list of the children of "myfolder" is then prepared and added to the list of files to be restored (924) and "my folder" is removed from the list of entries to be restored. Accordingly, whatever is within the directory "myfolder" is on the list to be restored. The next item in the list of files to be restored is retrieved (926), and the children of "myfolder" is then restored (928) in a similar fashion till all the entries to the leaf level are restored.

Although directories and files are used for exemplary purposes, the techniques presented herein can apply to any file system element. The techniques presented herein can be used with a raw block backup of a file system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer-implemented method for identifying a file system element for restoration comprising:
   receiving a request to restore a file system element;
   using a processor to determine an offset, from a beginning of a collection of records, indicating where a record associated with the file system element is located within the collection of records, wherein:
   the collection of records includes a file metadata file that includes one or more variable-length records associated with those file system elements that are files and a directory metadata file that includes one or more variable-length records associated with those file system elements that are files; and the record includes metadata associated with the file system element;

using the processor to determine whether the file system element is a file or a directory;

using the determined offset to retrieve the record from the collection of records on a storage device, including by retrieving the record from the file metadata file at the determined offset in the event the file system element is a file or by retrieving the record from the directory metadata file at the determined offset in the event the file system element is a directory; and restoring the file system element using the metadata included in the retrieved record.

2. The method of claim 1, wherein a most significant bit indicates whether the file system element being restored is a file or a directory.

3. The method of claim 2, wherein the most significant bit and/or the offset is/are stored in a table.

4. The method of claim 1, wherein the record is a first record and determining an offset includes retrieving a second record associated with the file system element being restored, that includes the offset of the first record.

5. The method of claim 1, further comprising determining a second offset of a second record associated with the record.

6. The method of claim 1, wherein the association of the record with the file system element occurs via an inode and/or a value that uniquely identifies the file system element.

7. A system for identifying a file system element for restoration comprising:
a processor configured to:
receive a request to restore a file system element;
determine an offset, from a beginning of a collection of records, indicating where a record associated with the file system element is located within the collection of records, wherein:
the collection of records includes a file metadata file that includes one or more variable-length records associated with those file system elements that are files and a directory metadata file that includes one or more variable-length records associated with those file system elements that are files; and
the record includes metadata associated with the file system element;
determine whether the file system element is a file or a directory;
use the determined offset to retrieve the record from the collection of records, including by retrieving the record from the file metadata file at the determined offset in the event the file system element is a file or by retrieving the record from the directory metadata file at the determined offset in the event the file system element is a directory; and
restore the file system element using the metadata included in the retrieved record; and
a storage device on which the collection of records is stored.

8. A computer program product for identifying a file system element for restoration, the computer program product being embodied in a computer readable storage medium and comprising computer instructions for:
receiving a request to restore a file system element;
determining an offset, from a beginning of a collection of records, indicating where a record associated with the file system element is located within the collection of records, wherein:
the collection of records includes a file metadata file that includes one or more variable-length records associated with those file system elements that are files and a directory metadata file that includes one or more variable-length records associated with those file system elements that are files; and
the record includes metadata associated with the file system element;
determining whether the file system element is a file or a directory;
using the determined offset to retrieve the record from the collection of records, including by retrieving the record from the file metadata file at the determined offset in the event the file system element is a file or by retrieving the record from the directory metadata file at the determined offset in the event the file system element is a directory; and
restoring the file system element using the metadata included in the retrieved record.

9. The method of claim 1, wherein the record has a variable length.

10. The method of claim 1, wherein:
receiving the request includes receiving a path, which includes a root, to the file system element within a file system; and
determining the offset includes:
accessing a root record associated with the root; and
in the event there is a next path element in the path after the root, determining from the accessed root record an inode number of the next path element.

11. The system of claim 7, wherein:
the processor is configured to receive the request by receiving a path, which includes a root, to the file system element within a file system; and
the processor is configured to determine the offset by:
accessing a root record associated with the root; and
in the event there is a next path element in the path after the root, determining from the accessed root record an inode number of the next path element.

12. The computer program product of claim 8, wherein:
the computer instructions for receiving the request include computer instructions for receiving a path, which includes a root, to the file system element within a file system; and
the computer instructions for determining the offset include computer instructions for:
accessing a root record associated with the root; and
in the event there is a next path element in the path after the root, determining from the accessed root record an inode number of the next path element.

13. The method of claim 1 further comprising determining a type of file system element being restored, wherein in the event the file system element is a directory: the components of the file system element include one or more children of the directory, the record identifies the children of the directory, and restoring the file system element includes adding the children of the directory identified by the record to a list of file system elements to be restored.

14. The system of claim 7, wherein the processor is further configured to determine a type of file system element being restored, wherein in the event the file system element is a directory: the components of the file system element include one or more children of the directory, the record identifies the children of the directory, and the processor is configured to restore the file system element by adding the children of the directory identified by the record to a list of file system elements to be restored.

15. The computer program product of claim 8 further comprising computer instructions for determining a type of file system element being restored, wherein in the event the file system element is a directory: the components of the file system element include one or more children of the directory, the record identifies the children of the directory, and restoring the file system element includes adding the children of the directory identified by the record to a list of file system elements to be restored.

16. The method of claim 10, wherein determining the offset further includes in the event there is a next path element in the path after the root:
    multiplying the inode number of the next path element with an integer to generate a location in an inode index table; and
    accessing the inode index table at the location generated by multiplying to retrieve an offset of a record associated with the next path element.

17. The system of claim 11, wherein the processor is further configured to determine the offset in the event there is a next path element in the path after the root by:
    multiplying the inode number of the next path element with an integer to generate a location in an inode index table; and
    accessing the inode index table at the location generated by multiplying to retrieve an offset of a record associated with the next path element.

18. The computer program product of claim 12, wherein the computer instructions for determining the offset further includes in the event there is a next path element in the path after the root computer instructions for:
    multiplying the inode number of the next path element with an integer to generate a location in an inode index table; and
    accessing the inode index table at the location generated by multiplying to retrieve an offset of a record associated with the next path element.

19. The method of claim 1, wherein:
    each record in the file metadata file includes (1) an inode number of a file that that record is associated with, (2) one or more attributes of the file that that record is associated with, and (3) one or more locations of data blocks on storage that comprise the file that that record is associated with; and
    each record in the directory metadata file includes (1) an inode number of a directory that that record is associated with and (2) inode numbers of children, if any, of the directory that that record is associated with.

20. The system of claim 7, wherein:
    each record in the file metadata file includes (1) an inode number of a file that that record is associated with, (2) one or more attributes of the file that that record is associated with, and (3) one or more locations of data blocks on storage that comprise the file that that record is associated with; and
    each record in the directory metadata file includes (1) an inode number of a directory that that record is associated with and (2) inode numbers of children, if any, of the directory that that record is associated with.

21. The computer program product of claim 8, wherein:
    each record in the file metadata file includes (1) an inode number of a file that that record is associated with, (2) one or more attributes of the file that that record is associated with, and (3) one or more locations of data blocks on storage that comprise the file that that record is associated with; and
    each record in the directory metadata file includes (1) an inode number of a directory that that record is associated with and (2) inode numbers of children, if any, of the directory that that record is associated with.

* * * * *